United States Patent [19]

Martin et al.

[11] Patent Number: 5,862,455
[45] Date of Patent: Jan. 19, 1999

[54] FADING SIMULATOR

[75] Inventors: Andrew Louis Martin, Ferny Creek; David Lewis Beard, Warranwood, both of Australia

[73] Assignee: Martin Communications Pty Ltd, Mount Waverley, Australia

[21] Appl. No.: 549,790

[22] PCT Filed: May 30, 1994

[86] PCT No.: PCT/AU94/00287

§ 371 Date: Dec. 5, 1995

§ 102(e) Date: Dec. 5, 1995

[87] PCT Pub. No.: WO94/29975

PCT Pub. Date: Dec. 22, 1994

[30] Foreign Application Priority Data

Jun. 7, 1993 [AU] Australia .................... PL9214

[51] Int. Cl.⁶ .................................... H04B 2/18
[52] U.S. Cl. ................. 455/67.7; 455/67.6; 455/304; 455/305; 455/306; 455/65
[58] Field of Search ................. 455/52.1, 52.3, 455/65, 67.1, 67.6, 304, 305, 306; 370/10, 40, 90

[56] References Cited

U.S. PATENT DOCUMENTS

| | | | |
|---|---|---|---|
| 3,863,155 | 1/1975 | Cornell | 325/67 |
| 4,679,248 | 7/1987 | McKeown | 455/226 |
| 4,766,600 | 8/1988 | Martin | 370/10 |
| 5,062,148 | 10/1991 | Edwards | 455/52 |
| 5,305,347 | 4/1994 | Roschmann et al. | 455/67.1 |
| 5,355,519 | 10/1994 | Hasegawa | 455/52.3 |
| 5,465,393 | 11/1995 | Frostrom et al. | 455/54.1 |

FOREIGN PATENT DOCUMENTS

| | | |
|---|---|---|
| 0 304 625 | 3/1989 | European Pat. Off. . |
| 36 19 175 | 12/1987 | Germany . |
| WO 89/12364 | 12/1989 | WIPO . |

OTHER PUBLICATIONS

Patent Abstracts of Japan, E–880, p. 4, JP 1–274526 (1989).
Patent Abstracts of Japan, E–1356, p. 101, JP 4–351024 (1992).
Patent Abstracts of Japan, E–139, p. 53, JP 57–121338 (1982).
Patent Abstracts of Japan, E–77, p. 2746, JP 52–30101 (1977).
Derwent Abstract Accession No. K7682B/46, SU 648997 (1979).

*Primary Examiner*—Tommy P. Chin
*Assistant Examiner*—Anand S. Rao
*Attorney, Agent, or Firm*—Foley & Lardner

[57] ABSTRACT

A fading simulator for generating multipath-faded test signals which have attenuation notches of precisely controllable frequency position and attenuation depth from a modulated input signal of known bandwidth. The input signal is fed to a splitter that directs two in-phase components to a first path and a second path. The input to each path is divided by a splitter into in-phase and quadrature sub-signals having a quadrature phase relationship, each sub-signal being fed to a respective inverting attenuator, the outputs of the attenuators then being combined in a combiner and the combined output being passed through a variable delay line to generate the output of the respective path. The outputs of each path are then combined in a combiner circuit to generate the multipath-faded test signal. All four inverting attenuators are preferably substantially identical to one another so that the two paths have close to identical temperature-drift and other characteristics. The attenuators and delay lines are electronically controlled in tandem, preferably using a microprocessor and stored program, to generate precision, static or dynamic, attenuation notches desired.

10 Claims, 2 Drawing Sheets

FADING SIMULATOR

TECHNICAL FIELD

This invention relates to electronic fading simulators and simulation methods for use in simulating the short-term fading of radio signals due to multi-path interference phenomena. Such simulators may be used to check the ability of radio receiving equipment, such as high-capacity digital microwave receivers, to handle various types and patterns of signal fades with respect to data loss.

BACKGROUND TO THE INVENTION

The background to the present invention is set out in the specification of prior PCT patent application No. PCT/AU89/00254 filed in the name of the of the present applicant (herein called 'our prior application'). Reference should be made to the specification of that application for a discussion of the technical problems faced in the design and operation of fading simulators and for an explanation of the applicant's desiderata in designing such devices.

The simulator of our prior application allowed microprocessor-controlled calibration of notch depth and notch position as independent variables thereby greatly reducing calibration time. Since the drift of component parameters normally requires frequent re-calibration of the simulator during use, the significant reduction in calibration time offered by the simulator design and method of our prior application provided a substantial advantage with respect to the art at the time it was filed. Nevertheless, calibration of that simulator could still take a few minutes and it would clearly be desirable if such calibrations were to take much less time while still allowing accurate and predictable simulation of deep signal fades which sweep rapidly across the signal spectrum.

U.S. Pat. No. 5,062,148 to Edwards discloses a multipath fading simulator in which each path includes a 180° phase shifter and an attenuator which are jointly controlled so that each phase shifter contributes to the total difference in phase between the paths and so that each attenuator contributes to the required signal level difference between the paths. By closely matching the characteristics of the two phase shifters, compensation for parameter drift and errors in the phase shifters can be achieved. Similarly, by matching the attenuators, compensation for drift and errors can be achieved. However, calibration is complicated and calibration time is increased.

OBJECTIVES OF THE INVENTION

It is therefore the object of the invention to provide a fading-simulator and method which enable shorter calibration times and/or longer times between calibrations without sacrificing precision or fading performance with respect to simulators of the prior art.

OUTLINE OF INVENTION

This invention is based upon the realisation that, by using an inverting attenuator and a delay line in each path, the two paths of the simulator could be made substantially identical and the differential drift of the parameters of the components in these paths could be significantly reduced so that fewer calibration points are needed, more rapid calibration of the simulator should be possible and/or greater stability over a longer period would be obtained. In the system according to the invention, an inverting attenuator is understood to be a complex attenuator by which phase shift can be continuously controlled through 360° (2π radians). Such an approach is, however, counter-intuitive as it involves adding many 'unnecessary' components to the signal path that is not normally deliberately phase-shifted and, therefore, increasing the complexity of the circuit and, superficially, the time required for calibration. Moreover, to be effective, the 'unnecessary' components in the path which is not normally phase-shifted in a controlled manner, must now be controlled in tandem with the components in the control-path, a requirement which intuitively could be expected to result in delays and inaccuracy. Tandem control will normally be effected by using one inverting attenuator to set the nominal signal phase and amplitude difference between the two paths while simultaneously using the other inverting attenuator to make minor adjustments to phase shift attenuation according to calibration tables.

From one aspect, therefore, the invention comprises a method of generating a multipath-faded test signal, having an attenuation notch of controllable frequency position and/or attenuation depth, from a modulated input signal of known bandwidth, comprising the steps of: feeding the input signal through two parallel paths having similar (preferably, substantially identical) electronically-controllable inverting attenuators in each path, combining the signals from each path and similar delay lines (or portions thereof) in each path to generate a multipath-faded test signal, and jointly controlling the inverting attenuators to generate the desired attenuation notch within the test signal. Though the signal in each path is delayed using a delay line, it will be appreciated that the delays will not always be identical as it is desirable that at least one of the delay lines be adjustable or switchable.

Normally, the modulated input signal will be passed through a splitter circuit which feeds each of the two paths and the outputs from the attenuator means will be mixed in a combiner circuit to generated the faded test signal. The two outputs of the splitter may be in-phase or in quadrature (ie; have a 90° phase difference).

In one possible configuration, each of the attenuator means may comprise a pair of inverting attenuators arranged in parallel, the inputs of each pair of inverting attenuators being derived from a quadrature splitter and the outputs of each pair being mixed by a combiner circuit. In this configuration, the outputs of the splitter circuit which feeds the two paths need not be phase-shifted relative to each other.

In another possible configuration, the outputs of the splitter circuit which feeds the two paths may be phase-shifted with respect to one another and, if so, a quadrature (90°) shift is preferred. In that case, each path may comprise a further splitter having one output which feeds an inverting attenuator that, in turn, feeds one input of a further combiner before the two paths are re-joined (by combing the outputs of the further combiners) by means of the first-mentioned combiner circuit. The two outputs of each of the two further splitters need not be phase-shifted with respect to one another. The second output of each of the further splitters is then preferably fed via a respective further inverting attenuator to the second input of the further combiner in the other path.

From another aspect, therefore, the present invention comprises a fading simulator for generating multipath-faded test signals, having attenuation notches of controllable frequency position and/or attenuation depth, from a modulated input signal of known bandwidth, comprising: a first signal path and a second signal path extending in parallel between input circuit means at which the paths diverge and output circuit means at which the paths converge, first electronically-controllable complex attenuator means connected in the first path for effecting the dynamic attenuation and phase-shifting of the signal in that path, second electronically-controllable complex attenuator means substantially identical or similar to the first attenuator means connected in the second path for effecting the dynamic attenuation and phase-shifting of the signal in that path, and electronic control means connected to each complex attenuator for controlling them in tandem and in accordance with a stored program to generate an output multipath dynamically-faded test signal determined by the program.

It will be appreciated that fading simulators of the type indicated are of balanced or symmetrical form so that component drift in one arm or path will be compensated by much the same drift in the same components in another complementary arm or path. This enables much greater precision in calibration, much longer times between successive recalibrations and/or much fewer calibration points to achieve a satisfactory accuracy operation. Note again that calibration involves the use of microprocessor controls and methods substantially as described in our above-mentioned prior patent application.

DESCRIPTION OF EXAMPLES

Having broadly portrayed the nature of the present invention, particular embodiments will now be described by way of example and illustration only. In the following description, reference will be made to the accompanying drawings in which.

The fading simulator of both embodiments of the invention are suitable for use in digital radio analyser instruments for testing high capacity microwave links (eg, 256QAM) being capable of generating maximum notch depths of in excess of 65 dB, attenuation steps of better than 0.5%, frequency precision of better than 0.05% bandwidth, and notch-sweep rates of up to 4000 MHz/s. The general principles of the operation and control of the simulator and the functions of the associated digital radio analysers are as disclosed in our prior patent application.

Figure 1:
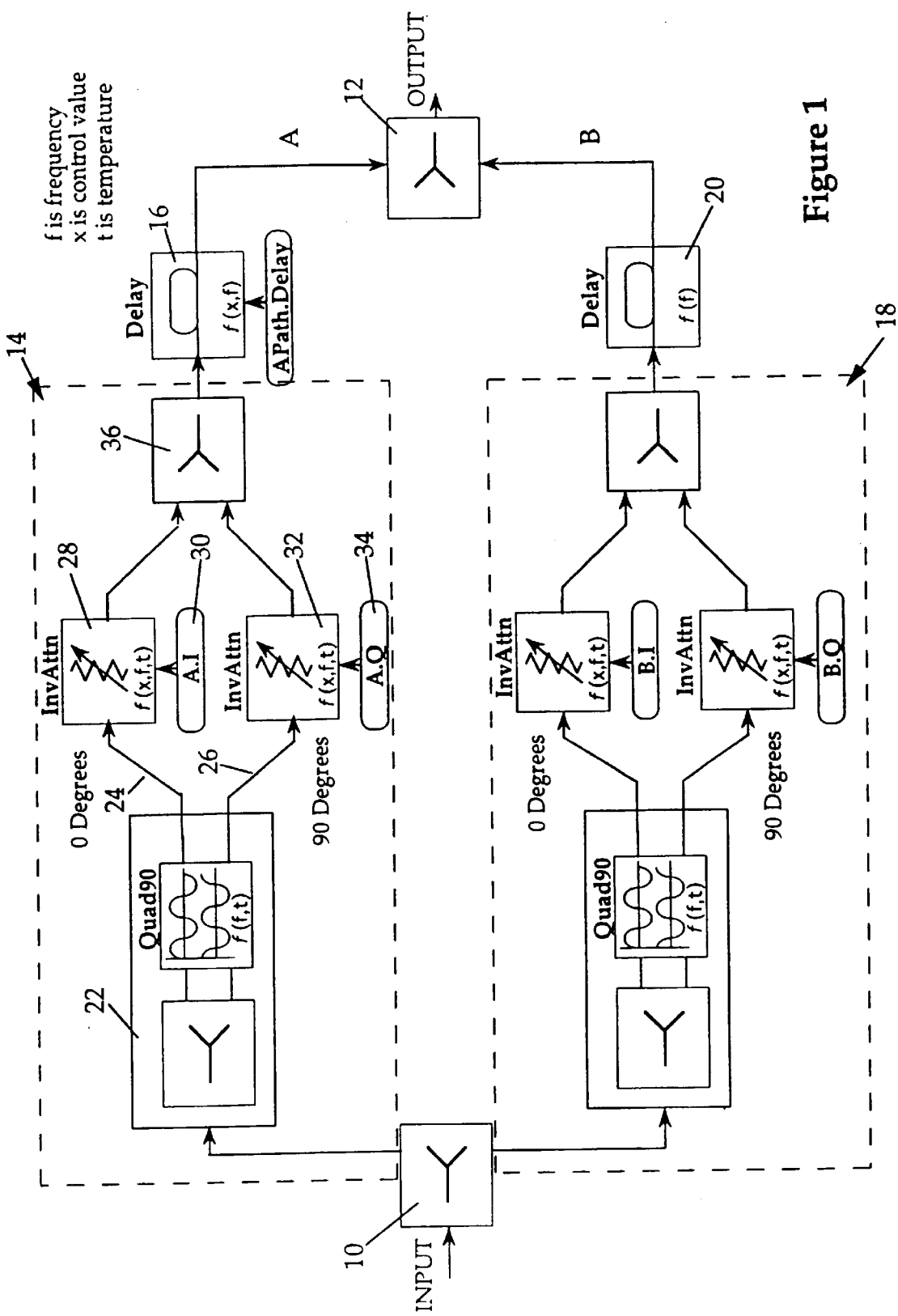
FIG. 1 is a block diagram of a first example of a balanced or symmetrical fading simulator which can be built from commercially available components in accordance with the principles of the present invention.

Referring now more particularly to the embodiment shown in FIG. 1, a modulated input signal having a bandwidth of, say, 45 MHz and a median frequency of, say, 75 MHz is fed into a 'Magic-T' splitter 10 which generates two substantially identical outputs that are fed through two substantially identical parallel paths (Path A and Path B) to be re-combined in Magic-T combiner 12 to form the desired faded test-signal output. Path A comprises a complex attenuator circuit 14 in series with a controllable delay-line 16, while Path B comprises an identical complex attenuator circuit 18 in series with a delay-line 20 that is essentially the same as delay line 16 except that it need not be controllable. That is, delay-line 20 may be of a fixed length while delay-line 16 may be switchable to connect two or more different lengths of line in-circuit. Such a switchable delay-line was described in our prior patent application.

Since the complex attenuator circuits 14 and 18 are essentially identical, only the components of attenuator 14 will be described. Attenuator circuit 14 comprises a quadrature hybrid splitter 22 which generates an un-phaseshifted output signal ("0 Degrees") on line 24 and a 90° phase-shifted output signal ("90 Degrees) on line 26. The signal on line 24 is fed to a first inverting attenuator 28 which may be controlled by means of a unit 30 to vary the amplitude of the in-phase component in Path A (hence the label "A.I" on unit 30). The quadrature signal on line 26 is fed to a second inverting attenuator 32 which is arranged in parallel with attenuator 28 and is substantially identical thereto. Attenuator 32 is controlled by unit 34 so as to vary the amplitude of the quadrature signal in Path A (hence the label "A.Q" on unit 34). Finally the in-phase and quadrature outputs of attenuators 28 and 32 are combined in a Magic-T arranged as combiner circuit 36.

It will be appreciated that the output of each of the complex attenuator circuits (14 and 18) will be the input signal to the simulator with its amplitude attenuated by a controlled amount and its phase at any angle within $2\pi$ radians. Thus after combining the signals from the two paths A and B by means of combiner 12, the output of the simulator is the modulated input with a superimposed fade-notch. By controlling the four inverting attenuators (together with delay-line 16) in tandem, the notch can be made to become deeper or more shallow, wider or more narrow and to stay at a fixed frequency or to sweep rapidly or slowly within the bandwidth. Because the components in each path are substantially identical, they will have substantially identical temperature and control characteristics, making possible high-precision control with minimal calibration overhead.

Figure 2:
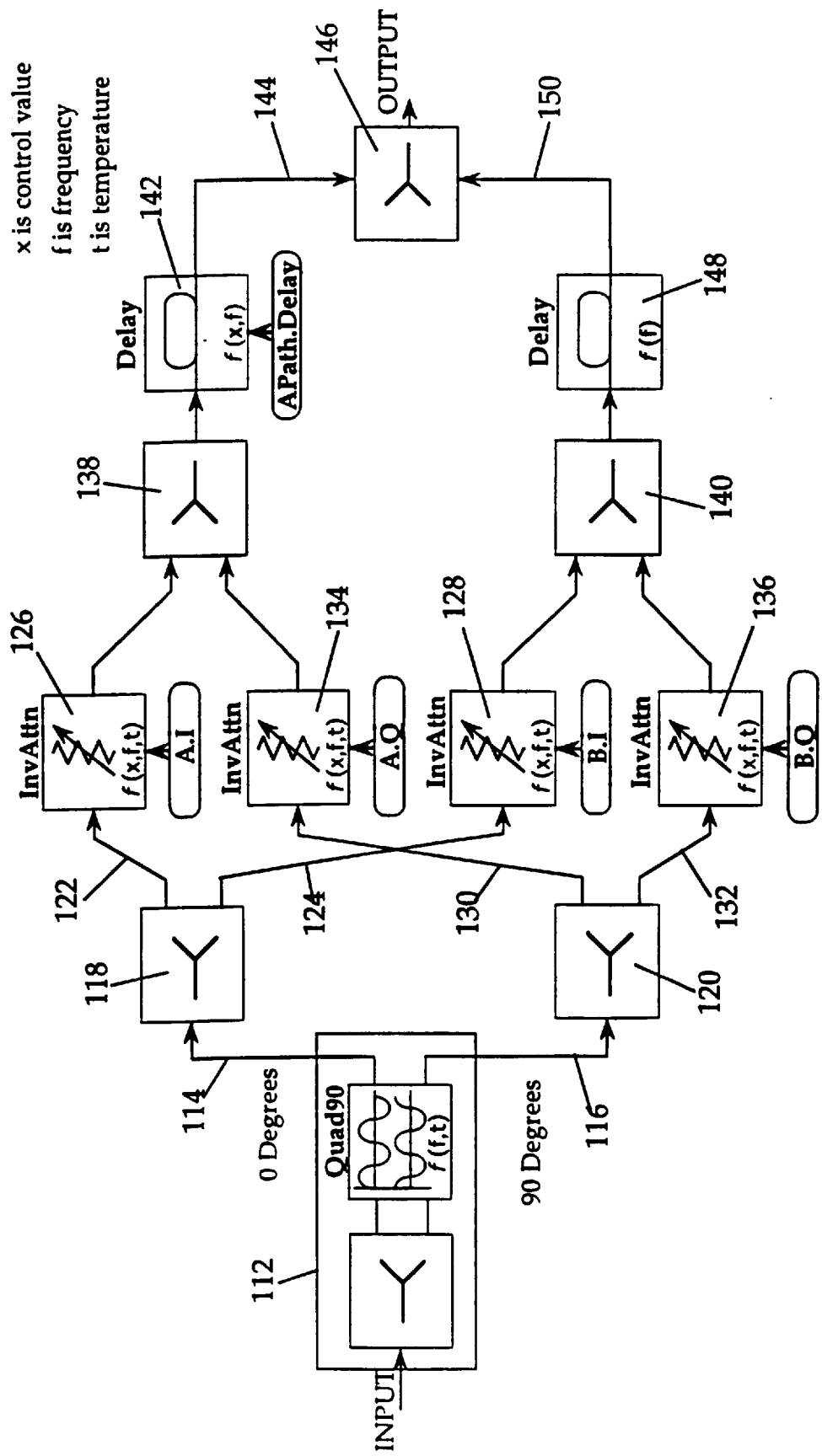
FIG. 2 is a block diagram of a second example of a balanced or symmetrical fading simulator which can be built from commercially available components in accordance with the principles of the present invention.

Referring now more particularly to the second embodiment as shown in FIG. 2, it will be seen that a symmetrical multi-path fading-simulator circuit is also involved. This circuit functions in an analogous fashion to that of the first embodiment to produce essentially the same results. It has been found that the second embodiment can be implemented more easily than the first, if microprocessor-driven controls of the type generally indicated in our prior patent application are employed.

The modulated input signal is fed into a quadrature hybrid splitter 112 which simply generates two outputs, one comprising an un-phaseshifted signal ("0 Degrees") on line 114 and a quadrature signal ("90 Degrees") on line 116. These outputs are fed to Magic-T splitters 118 and 120 (respectively) the outputs of which are not phase-shifted again relative to one another.

The outputs 122 and 124 of Magic-T 118 are passed to inverting attenuators 126 and 128 respectively, while outputs 130 and 132 of Magic-T 120 are passed to inverting attenuators 134 and 136 respectively. The outputs of attenuators 126 and 134 are mixed in another Magic-T circuit 138 configured as a combiner rather than a splitter, the outputs of attenuators 128 and 136 similarly being combined in a Magic-T 140.

The output of Magic-T/combiner 138 is fed via a controllable delay-line 142 to one input (144) of an output Magic-T/combiner 146 circuit, while the output of Magic-T/combiner 140 is fed via a fixed delay-line 148 via line 150 to the other input of output Magic-T/combiner 146.

Most of the circuit elements of both embodiments blocks can conveniently be formed from commercially available hybrid circuits; for example, from Minicircuits of Brooklyn, N.Y. Thus:

| Circuit Block No. | Minicircuits Type No. |
|---|---|
| FIG. 1 | |
| 22 | PSCQ-2-90 |
| 10, 36, 12 | TSC-2-1 |
| 28, 32, | PAS-3 |
| FIG. 2 | |
| 112 | PSCQ-2-90 |
| 118, 120, 138, 140, 146 | TSC-2-1 |
| 126, 128, 134, 136 | PAS-3 |

It will be appreciated from the above that the fading simulator can be operated substantially as described in our prior patent application in order to generate the desired faded test-signals by suitably controlling the four attenuators in tandem. However, it has been found that, despite nearly doubling the number of basic circuit elements in the simulator, the stability and precision obtainable are of an order of magnitude better than that obtained from simulators made in accordance with our prior patent application. The reason for this lies essentially in the reduction of differential parameter drift between the two arms or paths of the simulator with changing temperature.

It will also be appreciated that the examples of the invention described above meet the objects and advantages set out at the beginning of this specification. However, those skilled in the art will also understand that many variations and modifications can be made to the invention as disclosed without departing from its spirit or scope.

We claim:

1. A fading simulator for generating multipath-faded test signals having attenuation notches of controllable frequency position and attenuation depth, from a modulated input signal of known bandwidth, comprising:

first and second signal paths extending in parallel between input circuit means at which the paths diverge and output circuit means at which the paths converge;

first electronically-controllable inverting attenuator means connected in said first path, said first electronically-controllable inverting attenuator means having a given temperature characteristic for effecting dynamic attenuation and phase-shifting of the signal in said first path;

second electronically-controllable inverting attenuator means connected in said second path, said second electronically-controllable inverting attenuator means also having a temperature characteristic similar to said given temperature characteristic for effecting dynamic attenuation and phase-shifting of the signal in said second path;

a first delay line having a given electrical length, said first delay line being connected in series with said first electrically-controllable inverting attenuator means in said first path;

a second delay line having a given electrical length, said second delay line being connected in series with said second electrically-controllable inverting attenuator means in said second path; and electronic control means connected to said first and second delay lines for controlling the respective electrical lengths thereof, said electronic control means also being connected to said first and second electrically-controllable inverting attenuator means for controlling said first and second electrically-controllable inverting attenuator means in tandem such that one is adjusted relative to the other to ensure that a test signal is generated having a desired notch depth and position.

2. A fading simulator for generating multipath-faded test signals having attenuation notches of controllable frequency position and attenuation depth, from a modulated input signal of known bandwidth, comprising:

first and second signal paths extending in parallel between input circuit means at which the paths diverge and output circuit means at which the paths converge;

first electronically-controllable inverting attenuator means connected in said first path for effecting dynamic attenuation and phase-shifting of the signal in said first path;

second electronically-controllable inverting attenuator means connected in said second path for effecting dynamic attenuation and phase-shifting of the signal in said second path;

a first delay line having a given electrical length, said first delay line being connected in series with said first electrically-controllable inverting attenuator means in said first path;

a second delay line having a given electrical length, said second delay line being connected in series with said second electrically-controllable inverting attenuator means in said second path; and electronic control means connected to said first and second electronically-controllable inverting attenuator means, for controlling said first and second electronically-controllable inverting attenuator means in tandem, said electronic control means also being connected to said first and second delay lines for controlling the respective electrical lengths thereof, so as to generate a desired test signal, wherein each of said first and second electronically-controllable inverting attenuator means comprises:

a splitter circuit having an input, a first output and a second output, said splitter circuit being adapted to reproduce a signal received on the input of said splitter circuit as a first output signal on said first output and a second output signal on said second output of said splitter circuit, said first and second output signals being in a quadrature relationship to one another;

an electronically-controllable primary inverting attenuator connected to said first output, said electronically-controllable primary inverting attenuator having an output;

an electronically-controllable secondary inverting attenuator connected to said second output, said electronically-controllable secondary inverting attenuator having an output; and a combiner circuit connected to receive and combine said outputs of said electronically-controllable primary inverting attenuator and said electronically-controllable secondary inverting attenuator.

3. A fading simulator for generating multipath-faded test signals having attenuation notches of controllable frequency position and attenuation depth, from a modulated input signal of known bandwidth, comprising:

first and second signal Paths extending in parallel between input circuit means at which the paths diverge and output circuit means at which the paths converge;

first electronically-controllable inverting attenuator means connected in said first path for effecting dynamic attenuation and phase-shifting of the signal in said first path;

second electronically-controllable inverting attenuator means connected in said second path for effecting dynamic attenuation and phase-shifting of the signal in said second path;

a first delay line having a given electrical length, said first delay line being connected in series with said first electrically-controllable inverting attenuator means in said first path;

a second delay line having a given electrical length, said second delay line being connected in series with said second electrically-controllable inverting attenuator means in said second path; and electronic control means connected to said first and second electronically-controllable inverting attenuator means, for controlling said first and second electronically-controllable inverting attenuator means in tandem, said electronic control means also being connected to said first and second delay lines for controlling the respective electrical lengths thereof, so as to generate a desired test signal, wherein:

said input circuit means is adapted to divide the modulated input signal into first and second path-input signals having a quadrature phase relationship to one another; and wherein each of said first and second electronically-controllable inverting attenuator means comprises:

a splitter circuit having an input, a first output and a second output;

an electronically-controllable primary inverting attenuator connected to said first output, said electronically-controllable primary inverting attenuator having an output;

an electronically-controllable secondary inverting attenuator connected to said second output, said electronically-controllable secondary inverting attenuator having an output; and a combiner circuit having a first input and a second input, said first input being connected to said output of said electronically-controllable primary inverting attenuator, and said second input being connected to said output of said electronically-controllable secondary inverting attenuator.

4. A fading simulator for generating multipath-faded test signals having attenuation notches of controllable frequency position and attenuation depth, from a modulated input signal of known bandwidth, comprising:

first and second signal paths extending in parallel between input circuit means at which the paths diverge and output circuit means at which the paths converge;

first electronically-controllable inverting attenuator means connected in said first path for effecting dynamic attenuation and phase-shifting of the signal in said first path;

second electronically-controllable inverting attenuator means connected in said second path for effecting dynamic attenuation and phase-shifting of the signal in said second path;

a first delay line having a given electrical length, said first delay line being connected in series with said first electrically-controllable inverting attenuator means in said first path;

a second delay line having a given electrical length, said second delay line being connected in series with said second electrically-controllable inverting attenuator means in said second path; and electronic control means connected to said first and second electronically-controllable inverting attenuator means, for controlling said first and second electronically-controllable inverting attenuator means in tandem, said electronic control means also being connected to said first and second delay lines for controlling the respective electrical lengths thereof, so as to generate a desired test signal, wherein said input circuit means is adapted to divide the modulated input signal into first and second path-input signals each having an in-phase relationship, and wherein each of said first and second electronically-controllable inverting attenuator means comprises:

a splitter circuit having an input, a first output and a second output, said splitter circuit being adapted to reproduce a signal received on said input of said splitter circuit as a first output signal on said first output and a second output signal on said second output of said splitter circuit, said first and second output signals being in a quadrature relationship to one another;

an electronically-controllable primary inverting attenuator connected to said first output, said electronically-controllable primary inverting attenuator having an output;

an electronically-controllable secondary inverting attenuator connected to said second output, said electronically-controllable secondary inverting attenuator having an output; and a combiner circuit having a first input and a second input, said first input being connected to said output of said electronically-controllable primary inverting attenuator, and said second input being connected to said output of said electronically-controllable secondary inverting attenuator.

5. A method of generating a multipath-faded test signal, having an attenuation notch of controllable frequency position and attenuation depth, from a modulated input signal of known bandwidth, the method comprising the steps of:

dividing the input signal into first and second signal components that are provided onto first and second paths, respectively;

adjusting a phase and amplitude of said first signal component by using a first electronically-controllable inverting attenuator, said first electronically-controllable inverting attenuator having a given temperature characteristic;

delaying said first signal component for a predetermined time by using a first delay line;

adjusting a phase and amplitude of said second signal component by using a second electronically-controllable inverting attenuator, said second electronically-controllable inverting attenuator also having a temperature characteristic similar to said given temperature characteristic;

delaying said second signal component for a predetermined time by using a second delay line;

combining the adjusted and delayed first and second signal components to produce a multipath-faded test signal; and employing microprocessor means to jointly control said first and second electronically-controllable inverting attenuators and said first and second delay lines to generate a desired attenuation notch within said test signal; said microprocessor means controlling respective electrical lengths of said first and second delay lines, said microprocessor means jointly controlling said first and second electronically-controllable inverting attenuators such that one is adjusted relative to the other to ensure that a test signal is generated having a desired notch depth and position.

6. A method of generating a multipath-faded test signal, having an attenuation notch of controllable frequency position and attenuation depth, from a modulated input signal of known bandwidth, the method comprising the steps of:

dividing the input signal into first and second signal components;

adjusting a phase and amplitude of said first signal component by using a first electronically-controllable inverting attenuator;

delaying said first signal component for a predetermined time by using a first delay line;

adjusting a phase and amplitude of said second signal component by using a second electronically-controllable inverting attenuator;

delaying said second signal component for a predetermined time by using a second delay line;

combining the adjusted and delayed first and second signal components to produce a multipath-faded test signal; and employing microprocessor means to jointly control said first and second electronically-controllable inverting attenuators and said first and second delay lines to generate a desired attenuation notch within said test signal, wherein the phase and amplitude of each of said first and second signal components is adjusted by the following steps:

subdividing each of said first and second signal components into primary and secondary sub-component signals;

adjusting the phase and amplitude of said primary sub-component signals by using a primary inverting attenuator;

adjusting the phase and amplitude of said secondary sub-component signals by using a secondary inverting attenuator; and combining the adjusted primary and second sub-component signals to form the output of the respective first and second electronically-controllable inverting attenuators.

7. A method according to claim 6, further comprising the step of relatively phase-shifting said first and second signal components by 90° before adjusting the phase and amplitude thereof.

8. A method according to claim 6, further comprising the step of relatively phase-shifting by 90° said primary and second signal sub-components in each of said first and second electronically-controllable inverting attenuators before adjusting the phase and amplitude thereof.

9. A method of generating a multipath-faded test signal having an attenuation notch of at least one of controllable frequency position and attenuation depth, from a modulated input signal of known bandwidth through two parallel paths and combining the outputs of the two parallel paths to generate the test signal, the method comprising the steps of:

phase shifting input signals to the two parallel paths so that the input signals are in a quadrature relationship with respect to one another;

feeding the input signal of one of the two parallel paths to first and second controllable inverting attenuators, said first controllable inverting attenuator having a given temperature characteristic, said second controllable inverting attenuator also having a temperature characteristic similar to said given temperature characteristic;

feeding the input signal of the other of the two parallel paths to third and fourth controllable inverting attenuators, said third and fourth controllable inverting attenuators also having a respective temperature characteristic similar to said given temperature characteristic;

combining the outputs of the first and second controllable inverting attenuators to generate an output of the first path;

combining the outputs of the third and fourth controllable inverting attenuators to generate an output of the second path; and controlling each of said first, second, third and fourth controllable inverting attenuators in tandem to generate a desired test signal, said controlling step providing control such that one of each of said first through fourth controllable inverting attenuators is adjusted relative to the others to ensure that the desired test signal is generated having a desired notch death and position.

10. A method of generating a multipath-faded test signal having an attenuation notch of at least one of controllable frequency position and attenuation depth, by feeding a modulated input signal of known bandwidth through two parallel paths and combining the outputs of the two parallel paths to generate the test signal, the method comprising the steps of:

directing in-phase input signals to the two parallel paths;

splitting the input signal to each of the two parallel paths into in-phase and quadrature sub-signals;

feeding the in-phase and quadrature sub-signals of the first path respectively to the first and second controllable inverting attenuators and combining the outputs of the first and second controllable inverting attenuators to form an output of the first path, said first controllable inverting attenuator having a given temperature characteristic, said second controllable inverting attenuator also having a temperature characteristic similar to said given temperature characteristic;

feeding the in-phase and quadrature sub-signals of the second path respectively to the third and fourth controllable inverting attenuators and combining the outputs of the third and fourth controllable inverting attenuators to form an output of the second path, said third and fourth controllable inverting attenuators also having a respective temperature characteristic similar to said given temperature characteristic; and controlling each of said first, second, third and fourth controllable inverting attenuators in tandem to generate a desired test signal, said controlling step providing control such that one of each of said first through fourth controllable inverting attenuators is adjusted relative to the others to ensure that the desired test signal is generated having a desired notch depth and position.

* * * * *